No. 757,058. Patented April 12, 1904.

UNITED STATES PATENT OFFICE.

ROBERT E. SCHMIDT, OF ELBERFELD, GERMANY, ASSIGNOR TO FARBEN-FABRIKEN OF ELBERFELD CO., OF NEW YORK, N. Y., A CORPORATION OF NEW YORK.

1-8-NITROANTHRAQUINONE-SULFONIC ACID.

SPECIFICATION forming part of Letters Patent No. 757,058, dated April 12, 1904.

Application filed January 12, 1904. Serial No. 188,703. (No specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in 1-8-Nitroanthraquinone-Sulfonic acid; and I hereby declare the following to be a clear and exact description of my invention.

My invention relates to the manufacture of the hitherto unknown 1-8-nitroanthraquinone-sulfonic acid having the formula:

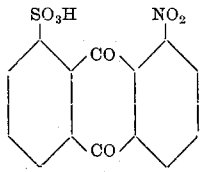

My process for producing this body consists in treating anthraquinone-alpha-sulfonic acid (see United States Letters Patent No. 743,664, dated November 10, 1903) with nitric acid or with other nitrating agents. The 1-8 and the 1-5 nitroanthraquinone-sulfonic acids are thus produced simultaneously, which can be readily separated from each other owing to the different degrees of their solubility or that of their salts.

In order to carry out my invention practically, I can proceed as follows, the parts being by weight: Fifty parts of nitric acid ($45\frac{1}{2}°$ Baumé) are introduced into a solution of one hundred parts of the potassium salt of anthraquinone-alpha-monosulfonic acid in seven hundred and fifty parts of a ninety-six per cent. sulfuric acid while stirring. The temperature rises during the operation. On further heating to 80° to 90° centigrade the 1-5-nitroanthraquinone-sulfonic acid separates in the shape of crystals. It is then stirred at this temperature for about from six to eight hours. After cooling, this acid is filtered off on asbestos from the reaction liquid, which contains the 1-8-nitroanthraquinone-sulfonic acid.

The 1-8-nitroanthraquinone-sulfonic acid is obtained in the shape of crystals on either adding to the filtered solution one hundred parts of water or on introducing the filtered solution into from twelve hundred to fifteen hundred parts of water and cooling. The sulfonic acid thus produced can be converted into its sodium or potassium salt by the addition of common salt or of chlorid of potassium to its aqueous solution. The new body thus obtained represents in the shape of its potassium salt microscopic needles soluble with difficulty in cold water. By reduction 1-amidoanthraquinone-8-sulfonic acid results. On being heated with an aqueous solution of monomethylamin it is transformed into the 1-methylamidoanthraquinone-8-sulfonic acid. By further heating this body with methylamin to 150° to 160° centigrade sym. 1-8-dimethyldiamidoanthraquinone results.

Instead of nitrating in a mixture of sulfuric acid and nitric acid the nitration can also be performed with conc. or monohydrated nitric acid alone.

Having now described my invention and in what manner the same is to be performed, what I claim as new, and desire to secure by Letters Patent, is—

The herein-described new 1-8-nitroanthraquinone-sulfonic acid, which in the shape of the potassium salt forms microscopic needles soluble with difficulty in cold water; being transformed into 1-8-amidoanthraquinone-sulfonic acid when treated with reducing agents, and being transformed into 1-methylamidoanthraquinone-8-sulfonic acid upon treatment with an aqueous solution of methylamin, substantially as described.

In testimony whereof I have signed my name in the presence of two subscribing witnesses.

ROBERT E. SCHMIDT.

Witnesses:
OTTO KÖNIG,
J. A. RITTERSHAUS.